United States Patent [19]

Keesen et al.

[11] Patent Number: 4,694,336
[45] Date of Patent: Sep. 15, 1987

[54] DIGITAL DATA TRANSMISSION METHOD

[75] Inventors: Heinz-Werner Keesen, Hanover; Günter Oberjatzas, Barsinghausen; Hartmut Peters, Hanover, all of Fed. Rep. of Germany

[73] Assignee: Telefunken Fernseh und Rundfunk GmbH, Hanover, Fed. Rep. of Germany

[21] Appl. No.: 851,531

[22] Filed: Apr. 14, 1986

[30] Foreign Application Priority Data

Apr. 12, 1985 [DE] Fed. Rep. of Germany ....... 3513074

[51] Int. Cl.⁴ .......................................... H04N 7/133
[52] U.S. Cl. .................................... 358/133; 338/13; 338/141; 370/83; 375/25
[58] Field of Search ................... 358/133, 141, 12, 13; 375/27, 25; 370/83

[56] References Cited

U.S. PATENT DOCUMENTS

| | | | |
|---|---|---|---|
| 4,007,021 | 2/1978 | Csajka | 375/67 |
| 4,205,200 | 5/1980 | Parikh | 370/83 |
| 4,237,552 | 12/1980 | Aikoh | 370/83 |
| 4,349,913 | 9/1982 | Skoog | 375/25 |
| 4,453,158 | 6/1984 | Bluethgen | 375/25 |
| 4,491,869 | 1/1985 | Heitmann | 358/13 |
| 4,541,012 | 9/1985 | Tescher | 358/133 |
| 4,562,426 | 12/1985 | Forney | 375/27 |
| 4,567,518 | 1/1986 | Driessen | 358/133 |
| 4,586,182 | 4/1986 | Gallagher | 375/25 |
| 4,633,296 | 12/1986 | Cham | 358/133 |

FOREIGN PATENT DOCUMENTS

| | | |
|---|---|---|
| 0084270 | 7/1983 | European Pat. Off. . |
| 2460654 | 7/1975 | Fed. Rep. of Germany . |
| 2706080 | 8/1978 | Fed. Rep. of Germany . |

OTHER PUBLICATIONS

W. Mauersberger, "Adaptive Transformationskodierung von Digitalisierten Bildsignalen", (Adaptive Transformation Coding of Digitalized Video Signals), Technical University of Achen (dissertation paper), Jul. 1980.
Huffman, "A Method for the Construction of Minimum-Redundacy Codes", Proceedings of the I.R.E., vol. 40, Sep. 1952, pp. 1098 to 1101.
R. C. Gallagher, Information Theory and Reliable Communication, (1968), John Wiley and Sons, Inc., (New York), pp. 52 to 56.
V. W. Keesen et al., "Codierung von Farbfernsehsignalen mittels modifizierter M–Transformation für die Übertragung über 34–Mbit/s-Kanäle", Frequenz, 38, (1984), 10, pp. 238-243.
K. Pabel, "Transformationen in der digitalen Signalverarbeitung, Teil 1", NTZ, vol. 37, (1984), No. 5, pp. 290-293; and Teil 2, NTZ, vol. 37, (1984), No. 6, pp. 364-369.
V. P. Pirsch, "Quellencodierung von Bildsignalen", NTZ, vol. 37, (1984), No. 10, pp. 651-652; No. 11, pp. 727-728; No. 12, pp. 799-800; vol. 38, (1985), No. 1, pp. 41-42; No. 2, pp. 99-100, and No. 3, pp. 171-172.
K. N. Ngan, "Adaptive Transform Coding of Video Signals", IEE Proc., vol. 129, No. 1, (Feb. 1982), pp. 28-48.
J. G. McWhirter et al., "Compact Low-power Coder for Extreme Bit Rate Reduction of Television Pictures", IEE Proc., vol. 127, (Oct. 1980), No. 5, pp. 368-383.
McCullough, "Data Compression in High-Speed Digital Facsimile", Telecommunications, Jul. 1977, pp. 40-43.
M. G. Croll et al., "'Nearly Instantaneous' Digital Compandor for Transmitting Six Sound-Programme Signals in a 2.048 Mbit/s Multiplex", Electronics Letters, vol. 9, No. 14, (Jul. 1973), pp. 298-300.
M. Ishii et al., "Digital Coding of NTSC Signals Using DPCM in the Hadamard-Transformed Domain", FUJITSU Scientific & Technical Journal, vol. 12, No. 2, (Jun. 1976), pp. 123-138.
S. Dworatschek, "Einführung in die Datenverarbeitung", 3rd Edition, Walter de Gruyter & Co., Berlin 1970, Chapter 2, pp. 88-112.
G. Held, "Data Compression, Techniques and Applications Hardware and Software Considerations", John Wiley & Sons, New York 1983, pp. 18-72.

Primary Examiner—Howard W. Britton
Attorney, Agent, or Firm—Spencer & Frank

[57] ABSTRACT

A method for transmitting digital video signals wherein spectral values are sorted according to magnitude and leading zeros are suppressed. In this way, the average word per pixel length can be reduced to about 1 bit, with image quality remaining acceptable.

20 Claims, 6 Drawing Figures

| TRANSMISSION OF THE AMOUNTS OF SPECTRAL VALUES ACCORDING TO MAGNITUDE | | | | |
|---|---|---|---|---|
| ADDRESS | SPECTRAL VALUE | BINARY VALUE | NUMBER OF BITS TO BE TRANSMITTED | NUMBER OF BITS SAVED |
| 1 | 16 | 0 0 1 1 1 1 | 6 | 0 |
| 2 | 7 | . . 0 1 1 0 | 4 | 2 |
| 4 | 3 | . . . 0 1 0 | 3 | 3 |
| 3 | 2 | . . . . 0 1 | 2 | 4 |
| 5 | 2 | . . . . . 1 | 1 | 5 |
| 6 | 1 | . . . . . 0 | 1 | 5 |
| 7 | 1 | . . . . . . | 0 | 6 |
| 8 | 1 | . . . . . . | 0 | 6 |

| 99 | 16 | 2 | -1 |
|---|---|---|---|
| 7 | 2 | 1 | 0 |
| 3 | 0 | 0 | 0 |
| -1 | 0 | 0 | 0 |

Fig. 3A

| X | 1 | 3 | 6 |
|---|---|---|---|
| 2 | 5 | 8 | 10 |
| 4 | 9 | 12 | 13 |
| 7 | 11 | 14 | 15 |

Fig. 3B

| TRANSMISSION OF THE AMOUNTS OF SPECTRAL VALUES ACCORDING TO MAGNITUDE ||||| 
|---|---|---|---|---|
| ADDRESS | SPECTRAL VALUE | BINARY VALUE | NUMBER OF BITS TO BE TRANSMITTED | NUMBER OF BITS SAVED |
| 1 | 16 | 0 0 1 1 1 1 | 6 | 0 |
| 2 | 7 | . . 0 1 1 0 | 4 | 2 |
| 4 | 3 | . . . . 0 1 0 | 3 | 3 |
| 3 | 2 | . . . . 0 1 | 2 | 4 |
| 5 | 2 | . . . . . 1 | 1 | 5 |
| 6 | 1 | . . . . . 0 | 1 | 5 |
| 7 | 1 | . . . . . . | 0 | 6 |
| 8 | 1 | . . . . . . | 0 | 6 |

Fig. 4

| TRANSMISSION OF MEAN VALUE (99) | 9 bits |
|---|---|

(16)

| TRANSMISSION OF THE NUMBER (9 UNITS) OF SPECTRAL VALUES UNEQUAL TO 0 | 4 bits |
|---|---|

(17)

TRANSMISSION OF THE AMOUNTS OF THE SPECTRAL VALUES ACCORDING TO MAGNITUDE (MSB)

(15)

| TRANSMISSION OF THE SIGNS FOR 8 SPECTRAL VALUES (MEAN VALUE ≃ 0) | 8 bits |
|---|---|

(18)

TRANSMISSION OF ADDRESSES AND ADDRESS DIFFERENCES (19)

| a) | | | | 1 | 4 bits |
|---|---|---|---|---|---|
| b) | (OTHER | MSB) | ADDRESS | 2 | 4 bits |
| c) | (OTHER | MSB) | ADDRESS | 4 | 4 bits |
| d) | (OTHER | MSB) | ADDRESS | 3 | 4 bits |
| e) | (SAME | MSB) | ADDRESS DIFFERENCE | 2 | 4 bits |
| f) | (OTHER | MSB) | ADDRESS | 6 | 4 bits |
| g) | (SAME | MSB) | ADDRESS DIFFERENCE | 1 | 4 bits |
| h) | (SAME | MSB) | ADDRESS DIFFERENCE | 1 | 4 bits |

Fig. 5

DIGITAL DATA TRANSMISSION METHOD

BACKGROUND OF THE INVENTION

The present invention relates to a method of transmitting digital data, particularly for digital video signals, wherein an analog signal is converted into a digital signal, wherein groups of values are processed in a source coder and then fed by a channel coder to a transmission channel, and wherein the groups of values travel from the transmission channel through a channel decoder to a source decoder.

According to the 1980 dissertation paper by W. Mauersberger at the Technical University of Aachen, entitled "Adaptive Transformationskodierung von digitalisierten Bildsignalen" [Adaptive Transformation Coding of Digitalized Video Signals], the problems encountered in digital communication involve the processing and transmission of the digital data. Source coding is employed to reduce the volume of data transmitted over one data channel (page 1 of the dissertation). The reduction of data is not realized by prediction or transformation but by quantizing of a preprocessed signal (page 67 of the dissertation). Before the transmission, a block, hereinafter called a matrix, of transformed values, hereinafter called spectral values or spectral coefficients, is classified. The classification is made in such a manner that, corresponding to their significance, a selected group of spectral values, which may be a row, a column, parts of a row or parts of a column or a combination of parts of a column and/or parts of a row, are transmitted. A total of seven classes are provided (pages 154 et seq.) Then the address of the class is transmitted and thereafter the quantized spectral values are transmitted. The drawback of this system is that redundant values are also transmitted.

Another method disclosed in FIG. 5 of European Offenlegungsschrift [patent application published without examination] No. 0,084,270, involves a zigzag scan with length of run coding. In this case, the matrix of spectral value is scanned diagonally beginning at the top left. The delay time indicates how many values have been transferred altogether before the run is terminated. Here again the drawback of the system is that redundant values in the path of the scanner are also transmitted.

SUMMARY OF THE INVENTION

It is an object of the present invention to provide an improved method of digital video signals wherein transmitting only relevant spectral values are transmitted and the mean word length of the spectral values is reduced.

The above object is achieved according to the present invention in that in a method of transmitting digital data, particularly for digital video signals, wherein an analog signal is converted to a digital signal, wherein groups of values are processed in a source coder and fed by a channel coder to a transmission channel, and wherein the groups of values travel from the transmission channel through a channel decoder to a source decoder; the source coder assigns an address to each value of a group; the values of the group are sorted according to magnitude, and the values sorted according to magnitude and the addesses of the associated values are transmitted with the word length of the sorted values decreasing with decreasing magnitude of the values.

According to the method of the invention, the spectral values of a matrix are sorted according to magnitude and the magnitudes of the spectral values are transmitted in succession, beginning with the greatest value. If the spectral values have been sorted according to magnitude, the magnitude of a spectral value always provides pre-information as to the magnitude of the next following spectral value. Since subsequent magnitudes must always be less than or equal to the preceding magnitude, the bit positions which would exceed the magnitude of the preceding value can be omitted. That means that the word length for the magnitudes of the spectral values decreases with an increasing number of transmitted spectral values.

As a further feature of the invention, address differences are transmitted instead of addresses if successive values lie in the same order of magnitude, i.e. if successive values each have their most significant bit (MSB), i.e., the highest valued bit, in the same position. Then addresses and addess differences can be transmitted in the Huffman code. This saves further bits. For better understanding of the invention, one embodiment thereof will be described below.

BRIEF DESCRIPTION OF THE DRAWINGS

FIGS. 3a and 3b show a matrix containing spectral values and a matrix containing addresses according to the preferred embodiment of the method according to the invention.

FIG. 4 shows the spectral values with associated binary words and with omitted bits for transmitting according to the method according to the invention.

FIG. 5 shows the steps of the method according to the invention.

DETAILED DESCRIPTION OF THE PREFERRED EMBODIMENT

Figure 1:
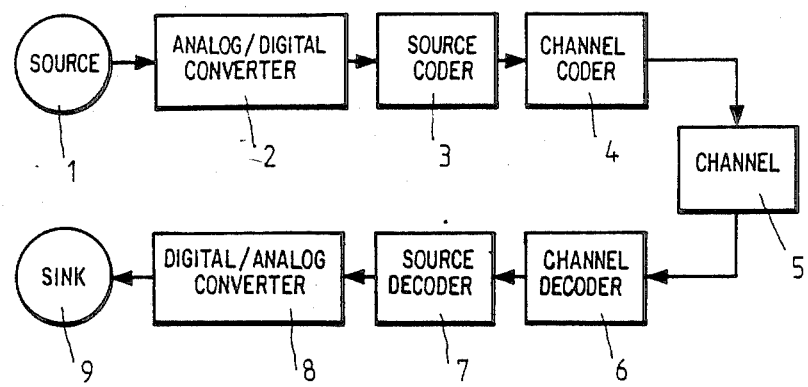
FIG. 1 is a block diagram of a digital transmission system for use with the method of the invention.

Referring now to FIG. 1, there is shown a digital data transmission system which includes a data source 1 particularly a video data source whose output is connected to the input of an A/D (analog to digital) converter 2. The output of the A/D converter 2 is connected to the input of a source coder 3 wherein the digital data signal is encoded for transmission and then fed via a channel coder 4 to a data transmission channel 5. The transmitted digital data at the recieving end of the data transmission channel 5 is fed via a channel decoder 6, a source decoder 7 and a D/A (digital/analog) converter 8 to a data sink 9 e.g. a display device for the video signal. The data transmission channel 5 may represent, for example, an HF transmission path or a digital video recorder. However, a digital video recorder may also be used which includes the A/D converter 2, the source coder 3, the channel coder 4, the channel 5, the channel decoder 6, the source decoder 7 and the D/A converter 8.

Figure 2:
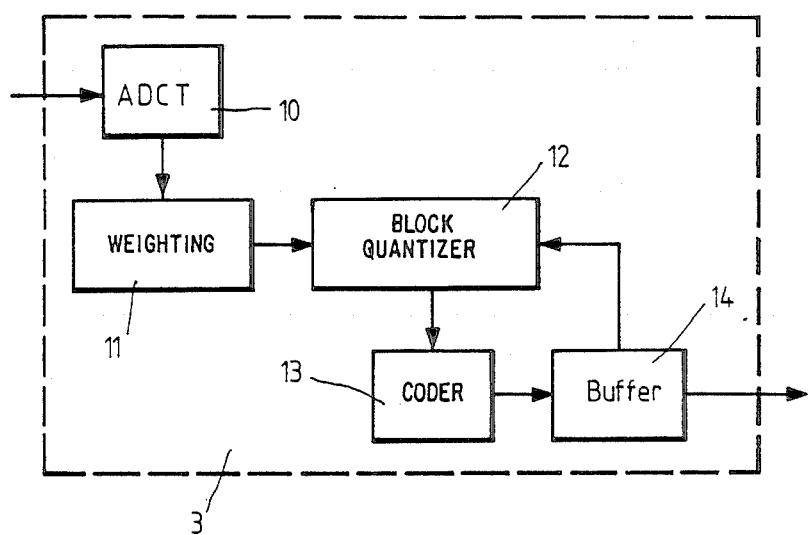
FIG. 2 is a more detailed block diagram of a source coder of FIG. 1.

As shown in FIG. 2 the digital signal entering the source coder 3 passes, in a known manner, first through an ADCT (adaptive discrete cosine transformer) 10, and then serially through a weighting device 11, a block quantizer 12, a coder 13 and finally buffer 14. Specifically for the transmission of images directly to a source coder 3 without intermediate storage, block quantizer 11 must be controlled in such a manner that sufficient data to generate an image having acceptable image quality are always available at the receiving end. Accordingly, as shown, the block quantizer 12 is responsive to an output from the buffer 14 so that the quantizing characteristic of quantizer 12 is controlled by the fill level of buffer 14.

FIG. 3a shows a block or matrix of spectral values as they are present at the input of block quantizer 11 after adaptive discrete cosine transformation. FIG. 3b shows addresses 1–15, which identify the position of the spectral values in the block of FIG. 3a. The location marked X contains the spectral value for the equal value component of the matrix, hereinafter called the mean value. Low addresses are arranged in such a manner that they are placed at locations at which relevant values are to be expected after a cosine transformation and/or after weighting. In practice, instead of the illustrative 4×4 matrix of FIGS. 3A and 3D, systems presently operate with an 8×8 matrix, which corresponds to 64 spectral values or 64 pixels per block or matrix.

According to the present invention, the block or matrix of spectral values of FIG. 3a are sorted according to magnitude and transmitted in the order of decreasing magnitude with the lengths of the words for the respective spectral values decreasing with decreasing magnitude. FIG. 4 illustrates how the spectral values, are sorted and transmitted according to the method of the invention.

FIG. 4 shows the spectral values of FIG. 3a in both decimal and binary representation, the associated addresses, the numbers of bits of the respective spectral values to be transmitted and the number of bits for each spectral value which are omitted i.e., not transmitted. According to the invention, only those spectral values whose magnitudes are greater than or equal to 1 (spectral value≧1) are transmitted. As shown, the spectral values are sorted according to magnitude so that the first or highest spectral value to be transmitted is the spectral value 16 at address 1. Since the number zero is not used, the binary value 1111 results for spectral value 16. This first spectral value 16 is transmitted as an entire value with, for example, six bits. For the first or greatest spectral value to be transmitted, the number of bits made available must be such that the spectral value can be represented as a binary value. Consequently, in this exmaple, this number of binary bits was selected to be six bits. Since the spectral values are transmitted in decreasing order of magnitude and since the first two most significant bits of the six bits are not used for spectral value 16, i.e., they are leading zeros, the number of bits in the transmitted signal used to define the next following spectral value can be limited to four bits. This conclusion can be redrawn or reversed in the source decoder 7 and is available to the source decoder 7 as preinformation for the next following spectral value 7. Thus two bits are saved when transmitting for the next following i.e., second, spectral value 7, and the second spectral value of 7 is transmitted with only four bits.

For the transmission of the third spectral value of magnitude 3 the available pre-information indicates that it is less than or equal to 7, i.e. that only three bits need be provided for the third spectral value. For the transmission of the fourth spectral value 2 with address 3, only two bits are provided since here the pre-information indicates that the fourth spectral value is less than or equal to 3. Similarly, for the transmission of the fifth spectral value with the magnitude of 2 and with the address 5, only one bit is provided since the pre-information indicated a value less than or equal to 2. Finally, the sixth spectral value has the magnitude of 1 and the address 6 as shown and is transmitted with one bit since the pre-information indicates a value of less than or equal to 2. All remaining spectral values need not be transmitted because they can only have the magnitude of 1.

Advantageously, sorting need not be done according to the actual magnitude of the spectral values, but only according to the most significant bit of the spectral value. Since the number of bits saved always depends on the highest valued bit (MSB), the positions of zeros and ones following the highest bit are without significance.

FIG. 5 shows the complete sequence of steps in the method according to the invention for the transmission of the spectral values of a group or matrix of values as shown in FIGS. 3a and 3b. In the first step 16, the mean value (99) in block or address X is transmitted. Since the mean value alone already substantially characterizes a matrix of spectral values, it is transmitted separately as an absolute or complete value with nine bits. In the second step 17, the number of the spectral values in the matrix which are unequal to zero are transmitted. In a matrix of sixteen words as shown in FIG. 3, four bits are required in order to transmit this number. As the third step 15, the magnitudes of the spectral values which are not equal to zero and which are sorted or arranged according to the magnitude are transmitted. After transmission of the number of sorted spectral values unequal to zero, the transmission of spectral values can be interrupted after transmission of the first spectral value with the magnitude of 1 because further spectral values can only have a magnitude of 1. That is, since spectral values with the magnitude of 0 are not transmitted, and since the spectral values are sorted according to magnitude and the number of spectral values not equal to zero is known at the receiving end (step 17), the transmission of the remaining spectral values with a magnitude of 1 can be omitted.

In the fourth step 18, the signs for the eight spectral values of the matrix are transmitted. The position of the fourth step 18 in the sequence has been selected arbitrarily with the only condition that it be carried out after the second step 17, i.e., the transmission of the number of spectral values unequal to 0. The sign of the mean value transmitted in step 16 is always positive since there are no negative mean values.

Finally, in the fifth step 19, the addresses of the transmitted spectral values in the matrix, e.g., the matrix of FIG. 3a are transmitted in the same order as the sorted spectral values. Preferably, according to a further feature of the invention, only an address difference is transmitted if successive spectral values are of the same order of magnitude, i.e., each have the same most significant bit. Thus, as shown in step 19 of FIG. 5, first the address 1 for the first transmitted spectral value, i.e., the value 16, is transmitted, followed by address 2, address 4, and then address 3, since the spectral values (see FIGS. 3a and 4) at all of these addresses have different most significant bits (MSB). However, the spectral value for the next address 5 has the same MSB as the immediately preceeding spectral value, i.e., the spectral value 2 for address 3. Accordingly, as shown in line (e) of step 19 of FIG. 5, the address value 5 is not transmitted, but only the address difference 2, i.e., the differences between address values 5 and 3, is transmitted. Since the next spectral value, i.e., 1, again has a different MSB, the complete address of this value, i.e., 6 as shown in line (f), is transmitted, and this address is followed by the address difference 1 and finally another address difference 1 as shown in lines (g) and (h) of step 19 since the MSB of the spectral values at the associated addresses 7 and 8 are again the same. Four bits are required for each address and each address difference, since addresses and address differences can reach a maximum value of 15.

With the method described in the third step 15, it can be seen whether addresses or address differences are being transmitted. Advantageously, addresses and address differences can be transmitted in the Huffman code. This results in a further saving of bits. The Huffman code is a coding algorithm developed by Huffman (1952) and always results n the code having the least redundance R. The Huffman Code is described e.g. in Proceedings I.R.E. 40 (1952) pages 1098–1101 or in the book Robert C. Gallagher: Information Theory and Reliable Communication, copyright 1968 by John Wiley & Sons, Inc. ISBN W-471-29048-3, Library of Congress Catalog Card Number 68-26850. A system using a Huffman Coder is described in European Patent Application Publ. No. 0 084270 corresponding to U.S. Ser. No. 336,984 of 04/01/82, now U.S. Pat. No. 4,541,012.

It will be understood that the above description of the present invention is susceptible to various modifications, changes and adaptations, and the same are intended to be comprehended within the meaning and range of equivalents of the appended claims.

What is claimed is:

1. In a method of transmitting digital data, particularly for digital video signals, including converting an analog signal to a digital signal, processing the digital signal as groups of values in a source coder, feeding the encoded groups of values to a channel coder and then to a transmission channel, and finally feeding the groups of values from the transmission channel through a channel decoder to a source decoder, the improvement comprising: in the source coder, assigning an address to each value of a group, sorting the values of a group according to magnitude, and transmitting said addresses and said values sorted according to magnitude, with the word length of said sorted spectral values decreasing with decreasing magnitude.

2. The method defined in claim 1 wherein the digital signal is quantized.

3. The method defined in claim 1 wherein said source coder includes the series connection of an adaptive discrete cosine transformer, a weighting device, a block quantizer, a coder and a buffer whose output is connected to the channel coder; and further comprising controlling the quantizing characteristic of the block quantizer by the fill level of the buffer.

4. The method defined in claim 1, wherein said values are transformed to spectral values which are sorted and transmitted in the order of their magnitude.

5. The method defined in claim 1 wherein leading zeros in the transmitted values are suppressed.

6. The method defined in claim 1 wherein said step of transmitting includes determining whether the most significant set bit of the magnitude of each value is the same or different from that of the immediately proceeding value of said sorted values, and, transmitting the actual address of a value if the most significant set bits are determined to be different and transmitting only the difference between the actual address and the immediately preceeding transmitted address or address difference if the most significant set bits are determined to be the same.

7. The method defined in claim 6 wherein the addresses and address differences are transmitted in the same order as the sorted transmitted sorted values.

8. The method defined claim 7 wherein said addresses and address differences are transmitted in the Huffman code.

9. The method defined in claim 1 including transforming said digital signal into a spectral range in the source coder.

10. The method defined in claim 9 wherein said digital signal and the spectral values are arranged in groups in the form of two-dimensional blocks or matrices.

11. The method defined in claim 10 wherein said step of sorting includes sorting the spectral values according to the highest valued set bit prior to transmission.

12. The method defined in claim 10 wherein only the magnitudes of said spectral values are transmitted during said step of transmitting.

13. The method defined in claim 12 wherein said step of transforming includes producing a spectral value for the equal value component of a block.

14. The method defined in claim 13 wherein prior to said step of sorting, the transformed said spectral values are given different weightings and are then quantized.

15. The method defined in claim 14 wherein said spectral value for said equal value component is given the highest weight.

16. The method defined in claim 13 further comprising transmitting said spectral value for the equal value component separately from the remaining said spectral values.

17. The method defined in claim 16 wherein said spectral value for said equal value component is always transmitted with a given number of bits.

18. The method defined in claim 17 wherein said given number of bits is at least equal to the number of bits of the largest remaining spectral value of a block.

19. The method defined in claim 16 further comprising: separating transmitting the signs of the sorted said spectral values of a block.

20. The method defined in claim 19 further comprising separately transmitting a value corresponding to the number of said spectral values of a block which are unequal to zero.

* * * * *